United States Patent [19]

Howe

[11] Patent Number: 4,878,456

[45] Date of Patent: Nov. 7, 1989

[54] ANIMAL TAIL TAG FOR INSECTICIDE PROTECTION

[75] Inventor: Steve R. Howe, Glendale, Ariz.

[73] Assignee: An-Tech International Livestock Products, Phoenix, Ariz.

[21] Appl. No.: 103,906

[22] Filed: Oct. 2, 1987

[51] Int. Cl.⁴ .................................. A01K 13/00
[52] U.S. Cl. .............................. 119/156; 40/300
[58] Field of Search .............. 119/156; 40/300, 301, 40/302, 303

[56] References Cited

U.S. PATENT DOCUMENTS

| | | | |
|---|---|---|---|
| 2,940,199 | 6/1960 | Goldberg | 40/301 |
| 3,388,492 | 6/1968 | Nichols, Jr. | 40/301 |
| 3,503,148 | 3/1970 | Nichols, Jr. | 40/300 |
| 4,581,834 | 4/1986 | Zatkos et al. | 40/301 |
| 4,721,064 | 1/1988 | Denk et al. | 119/156 |

*Primary Examiner*—Robert P. Swiatek
*Attorney, Agent, or Firm*—Nelson & Roediger

[57] ABSTRACT

A tail tag assembly for attachment to the tail switch of an animal including an engaging member having a slotted head which gathers animal hair as it is urged into an elongated member having a narrow passage therein. A retention shoulder is contained in the elongated member so that when the engaging member is urged into the elongated member it is retained. A pest-control strip is positioned between a flange on the engaging member and the adjacent portion of the elongated member so as to contact the animal body as the tail moves.

8 Claims, 1 Drawing Sheet

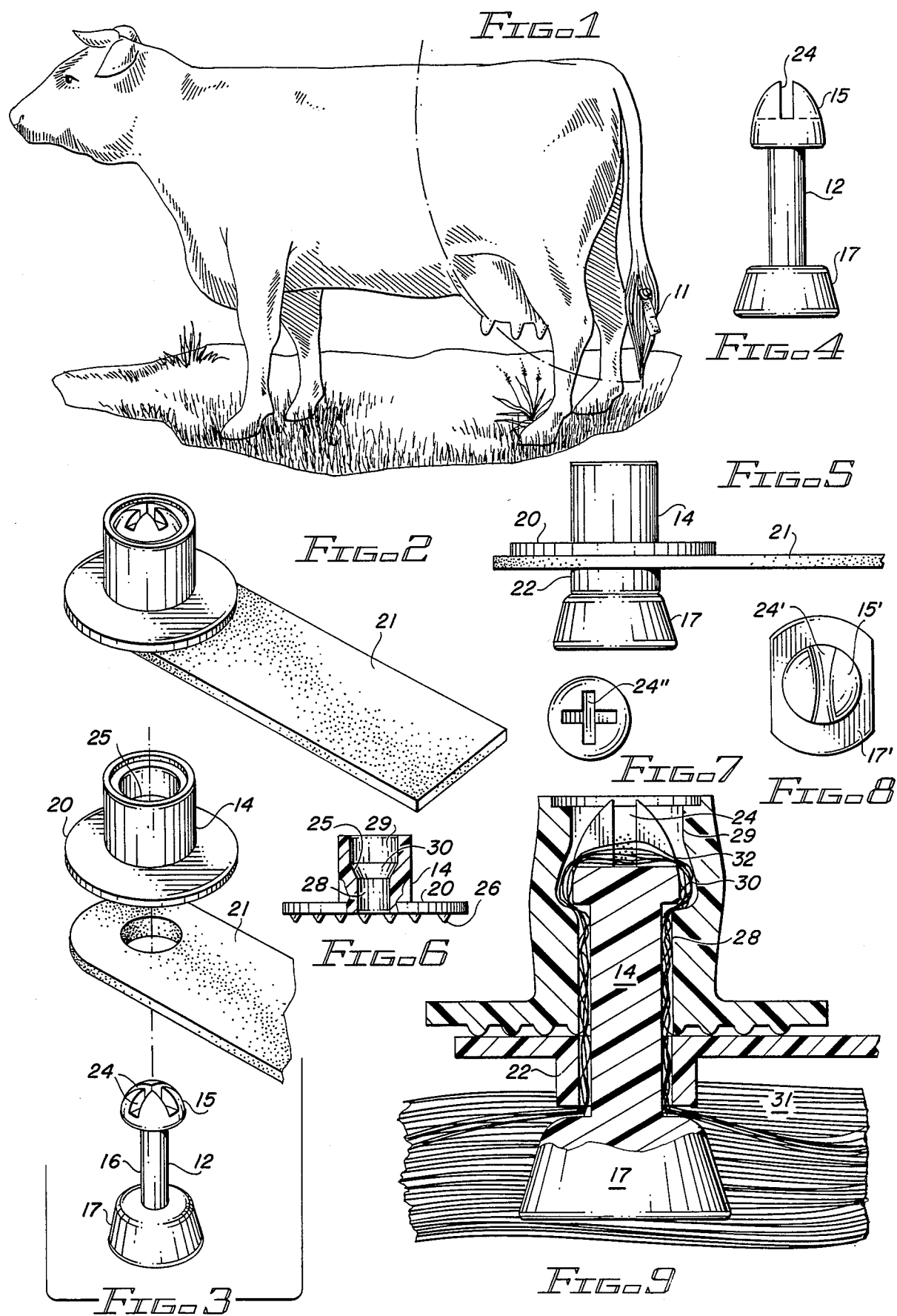

ANIMAL TAIL TAG FOR INSECTICIDE PROTECTION

BACKGROUND OF THE INVENTION

This invention relates to an animal tag for attachment to the hair thereof and which is well-suited for use as a means for the attachment of a pest-control device to cattle.

It is common practice in animal husbandry to utilize ear tags to identify specific animals in a herd and, thus, maintain breeding, production and health records. Typically, these tags are formed of two elements; one being a penetrating member which is urged through the ear of the animal, and the second, a receiving member which is positioned on the other side of the ear. The applicator is typically in the form of a pair of pliers with the components separately mounted on opposing jaw surfaces. The urging of the handles of the applicator toward the closed position results in the penetration of the ear and the forcing of that member into the receiving means positioned appropriately on the other side of the ear by the other jaw of the applicator. The ear tag provides ready identification and also provides a means for attachment of an insecticide distribution element since a strip having a pest-control active ingredient impregnated therein is frequently held in place by the ear tag.

The utilization of the ear tag for pest control purposes, in addition to identification, has been found desirable since the animal engages in actions with its head which tend to distribute the insecticide along adjacent portions of the body and, in addition, frequently contacts body portions of the other animals in the herd. Thus, the active ingredient is distributed along the adjacent frontal portions of the host's body over a period of time.

The ear tags, both the penetrating portion and the receiving portion, are normally made of flexible material and are dimensioned to provide a relatively loose fit so that air can pass thereabout. The importance of the air passage as an aid in the curing of the open wound regenerated by the application of the ear tag is recognized. In addition, the ear tag typically contains a large area or planar member made of an impregnated flexible material which gradually and continually releases a pest-controlling active ingredient from its surface. This active ingredient is the one which produces the desired insecticidal effect on the adjacent portions of this animal, as well as contacting animals in the herd.

The success with the ear tag and accompanying flexible strip containing the pest-controlling ingredient has generated substantial interest in repeating this desirable effect on the other body portions of the animal. The most likely candidate is the tail switch which can be the host for such a tag without invading the body of the animal. Since the application has to take place on an animal that is not frequently a willing recipient, the opportunity to braid the pest-controlling element into the hair of the tail switch of the animal is a difficult task requiring patience, and frequently more than one individual. Accordingly, a purpose of this invention is to provide a tail tag which can be firmly secured to the hair of the animal. Another objective is the provision of a tail tag which is readily applied by utilizing existing applicators without requiring substantial time to ensure a firm attachment. A further object of the invention is to provide a tail tag which can be easily manufactured at a relatively low cost. In addition, the ability of a single animal handler to effect such an attachment is a major objective of the invention.

SUMMARY OF THE INVENTION

The present invention is directed to a tail tag for attachment to the animal either alone or in combination with a pest-control element. The two-component tag includes an elongated engaging member which gathers a multiplicity of strands of animal hair as it passes through the tail switch and is urged through an elongated passage in a receiving means.

The engaging member includes a stem having opposing ends with a limit means affixed to one end and a slotted head affixed to the opposing end of the stem. The slotted head contains at least one transverse slot for gathering strands of hair as it is urged through the switch. The elongated receiving means, which is placed to receive the engaging member during attachment, is provided with a passage containing retention means for retainably receiving the slotted head and stem of the engaging member. During application, the urging of the slotted head and gathered strands through the passage in the elongated member and past the retention means, effects attachment of the apparatus to the hair of the animal.

The limit means affixed to the stem of the engaging member and the length of the stem and position of the retention means determine in part the position of the slotted head after it is urged through the passage and past the retention means. A region of small cross-sectional area is provided in the passage adjacent the end receiving the slotted head with the retention means located in a transition region to a large cross-sectional area of the passage in which the slotted head is retained. As a result, a relatively tight secure attachment can be obtained by the applicator in a single motion. The attachment operation can be completed by a single individual grasping the stem of the tail and utilizing the applicator on the switch portion of the animal's tail.

While the elongated receiving member can include indicia for identification purposes, in practice, a pest-controlling planar member is placed on the member prior to the effecting of attachment to the hair of the animal. As a result, the planar member is secured to the switch between the engaging and receiving members, and as the animal moves his tail about, contact is made with the rear flank of the animal to distribute the pest-controlling ingredient in regions which are not influenced directly by the use of such an element with an ear tag. Furthermore, the animal frequently causes his tail to travel about the body of adjacent animals in the herd, thus distributing the pest-controlling ingredient on the surface of these animals as well.

Further features and advantages of the invention will become more readily apparent from the following detailed description thereof when viewed in conjunction with the accompanying drawings.

BRIEF DESCRIPTION OF THE DRAWINGS

FIG. 1 is a side view of an animal having a tail tag with pest-control member attached.

FIG. 2 is a perspective view of one embodiment of the invention.

FIG. 3 is an exploded view of the embodiment shown in FIG. 2.

FIG. 4 is a side view of the engaging member of FIG. 2.

FIG. 5 is a partial side view of the embodiment shown in FIG. 2.

FIG. 6 is a side view in section of an elongated receiving member utilized in another embodiment of the invention.

FIGS. 7 and 8 are top plan views of different embodiments of the engaging member.

FIG. 9 is a side view in section showing the attachment of the embodiment of FIG. 2 to the tail switch of an animal.

DESCRIPTION OF THE PREFERRED EMBODIMENT

Referring now to FIG. 1, an animal is shown having a tail tag assembly 11 secured to its tail switch. The assembly includes a pest-control panel secured by a two-component tail tag including an engaging member which gathers a multiplicity of strands of the switch and which is secured to a receiving means. The dashed arcuate path shown in FIG. 1 is illustrative of the movement of the tail during the course of the day and the portion of this animal's body which is contacted by the pest-control member. It is to be noted that adjacent animals are also likely to encounter the pest-control member on the animal's tail during periods of normal activity. Thus, the coverage extends not only to this animal but also to other animals in the herd. Although the pest-control member is shown as a flexible strip which is impregnated with a desired insecticide, it is to be recognized that the member could include a surface reservoir system of insecticide, an adhesive tape placed upon the surface of the planar member and carrying the desired chemical or even an ampoule attached thereto adapted to be broken either by the person at the time of application or through continued use by the animal. The invention applies equally to these types of insecticide dispensing mechanisms utilized with the tail tag disclosed herein.

The embodiment shown in FIGS. 2 through 5, is comprised of an engaging member 12 shown in side view in FIG. 4 and elongated receiving member 14 which contains retention means therein for the slotted head 15 of engaging member 12.

The engaging member 12 includes a central stem having first and second ends with the slotted head 15 affixed to the first end thereof. The slotted head contains at least one transverse slot 24 extending thereacross. As noted, the embodiment shown utilizes two substantially orthogonal slots which each gather a multiplicity of strands of the hair in the tail switch as it is being urged through the switch into the elongated member. The opposing end of the stem 12 is provided with outwardly extending limit means 17. The diameter of the limit means exceeds that of the stem to form a shoulder therebetween which limits the movement of the engaging member in the axial direction when it is urged into position in elongated member 14. The elongated member 14 contains a flange 20 which is relatively large and provides a mating surface of the pest-control member 21 to distribute forces in the region proximate to the attachment opening in member 21.

Retention means 25 is contained within elongated member 14 and retainably receives the slotted head when it is urged through the passage in the elongated member. The retention means is formed by a shoulder existing in the transition region between different diameter portions of the passage through the elongated member. Elongated member 14 is formed of a flexible plastic member so that it is subject to deformation when force is applied to the outer surface of limit means 17 during application. The diameter of the initial portion of the passage through the elongated member is equal to or slightly less than the diameter of the slotted head. However, as will later be described, the transverse slots on the head 15 gather strands of animal hair between the teeth formed by the four ends located on head 15 as shown in FIG. 3 therein which extend in the axial direction along the stem, thus effectively increasing the diameter of the slotted head during use. When this takes place, deformation of the elongated member also occurs and continues on during normal usage. The preferred embodiment is shown in FIGS. 2 and 5 in the assembled position without being attached to the tail switch. Also, it should be noted that the pest-control member contains a downwardly extending sleeve 22 which is adjacent the shoulder of limit means 17. The circumferential region between the sleeve and the should provide the entry and exit paths for animal hair drawn across the transverse slots during affixation of the invention.

One example of an elongated member 14 containing retention means 25 is shown in the cross-sectional view of FIG. 6. The passage extending through the elongated member 14 includes an initial region of small cross-sectional area 28 and spaced adjacent thereto, a region of larger cross-sectional area 29 which serves as a housing for the slotted head. A transition region 30 is formed therebetween to provide a tapered internal wall surface which forms a shoulder to aid in retaining the slotted head 15 in the larger cross-sectional area of engaging member 12. Also, the underside surface of the flange 20 is provided with ridges 26. The ridges contact the adjacent surface of the pest-control member 21 to permit the movement of air through the device and promote cleanliness of the invention when installed. The spacing established by the ridges permits fluid flow therebetween so as to permit fluid entering the passage in the elongated member to exit between the member and the pest-control member 21. As mentioned previously, deformation of the flexible elongated member occurs during the insertion of the engaging member and the passage of the slotted head with strands contained therein through the passage. This is shown in further detail in FIG. 9.

The installation of the embodiment is depicted in the cross-sectional view of FIG. 9 wherein animal hairs of the tail switch 31 are gathered in part in slots 24 and thus extend upwardly along the passage through the slots 24 and exit on the other side of the engaging member 14. The hair strands 32 representing that portion of the tail switch gathered and drawn into the passage in the elongated member 14 are concentrated in the two orthogonal slots and are typically more widely distributed about the stem. The strands exit between the sleeve 22 and the abutting shoulder of limit means 17 as shown. It is to be noted that the diameter of the slotted head exceeds the diameter of the small cross-sectional area 28 so that force is necessary to urge the engaging member through the passage. The diameter of the large cross-sectional area 29 is sufficiently large to receive the slotted head. However, the strands 32 which extend outwardly of the slots along the outer surface of the head and into the passage cause deformation of at least the transition region 30 between the large and small area portions of the passage. In practice, the deformation may extend to the large cross-sectional area 29 if a substantial amuont of animal hair is drawn into the passage in elongated member 14.

The individual parts comprising the embodiment of the invention are adapted to be utilized in the present day applicators used to affix ear tags to animals. Among the different types of applicators found suitable for use with the present invention is the applicator marketed as the Apollo Ear Tag System by An Tech International of Phoenix, Arizona, wherein the user inserts the engaging member of one jaw and the elongated member plus pest-control member in an opposing jaw of a plier-like applicator. Both jaws contain shaped receiving slots and spring-loaded retaining members which keep the piece-parts in position until the jaws are closed and the engaging member is driven through the elongated member. In practice, any number of different force-providing applicators can be used.

The engaging member of FIG. 8 is shown with a different spaced limit means 17' for accommodation in a different applicator. Also, the slotted head 15' contains but a single transverse slot 24' shown with a narrowed portion in the central region thereof. A smaller embodiment of the engaging member with a slotted head coextensive with the size of the underlying limit means is shown in FIG. 7 wherein the slots 24" do not extend outwardly to the periphery of the slotted head. Other embodiments of engaging means having different shaped limit means and different types of slot configurations can be utilized for different applicators and different thickness animal hairs. Thus, the present invention is readily adaptable for use with a number of different commercial applicators.

The efficacy of the pest control member is documented from field testing of the animals containing these tail tags showing a substantial reduction in flies lighting on the rear portion of the animal. Heretofore, the ear tag plus pest-control member has resulted in insects avoiding the front half of the animal in favor of the rearmost portion. The present invention provides a solution to that problem. In addition, the ear tag plus pest-control strip is generally ineffective with stable flies which typically light on the hoofs and low legs of the animals. As noted in FIG. 1, the tail movement as shown by the dashed line includes the lower rear legs of this animal and it is also available to contact the legs of other animals in the herd.

While the above-description has referred to specific embodiments of the invention, it is recognized that variations and modifications may be made therein without departing from the scope of the invention as claimed.

What is claimed is:

1. Apparatus for attachment to the hair of an animal which comprises:
   (a) an engaging member for gathering a multiplicity of strands of animal hair, said member including:
      I. a stem having first and second ends;
      II. limit means affixed to the second end of said stem;
      III. a head affixed to the first end of said stem and having a cross-sectional area greater than said stem, the head containing at least one transverse slot recessed therein for gathering strands of animal hair, said at least one slot extending partially through the head;
   (b) an elongated member having a passage therethrough for receiving and surrounding the stem and head of said engaging member, said passage containing regions of large and small cross-sectional areas for receiving adjacent portions of said slotted head and stem respectively; and
   (c) retention means including a transition region contained in said elongated member and extending between said regions of large and small areas whereby the urging of said head and gathered strands through the small area region results in the frictional engagement of said strands between the elongated member and the engaging member within said transition region.

2. The invention in accordance with claim 1 wherein said slotted head contains two substantially orthogonal slots extending thereacross.

3. The invention in accordance with claim 2 wherein said slotted head has a convex surface containing said slots.

4. The invention in accordance with claim 3 wherein said slotted head contains a plurality of teeth for gathering strands in general alignment with said slots.

5. The invention in accordance with claim 1 wherein said elongated member includes a flange at one end thereof.

6. The invention in accordance with claim 5 further comprising a pesticidal release member interposed between said flange and said limit means.

7. The invention in accordance with claim 5 wherein the length of said passage in the elongated member is substantially equal to the length of the stem and slotted head.

8. The invention in accordance with claim 5 wherein the length of the region of large cross-sectional area in said elongated member is substantially equal to the height of the slotted head.

* * * * *